United States Patent
Ogawa et al.

(10) Patent No.: US 12,027,188 B2
(45) Date of Patent: Jul. 2, 2024

(54) DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Takuya Ogawa, Tokyo (JP); Wataru Tsukahara, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/180,013

(22) Filed: Mar. 7, 2023

(65) Prior Publication Data

US 2024/0105226 A1 Mar. 28, 2024

(30) Foreign Application Priority Data

Sep. 20, 2022 (JP) .................................. 2022-149286

(51) Int. Cl.
*G11B 5/596* (2006.01)
(52) U.S. Cl.
CPC ................................ *G11B 5/59655* (2013.01)
(58) Field of Classification Search
None
See application file for complete search history.

(56) References Cited

U.S. PATENT DOCUMENTS

| | | | | |
|---|---|---|---|---|
| 4,371,902 A | * | 2/1983 | Baxter | G11B 5/59655 360/77.03 |
| 5,796,712 A | * | 8/1998 | Moribe | G11B 27/24 |
| 6,130,797 A | * | 10/2000 | Akagi | G11B 11/10576 |
| 6,417,983 B1 | | 7/2002 | Yatsu | |
| 6,519,107 B1 | * | 2/2003 | Ehrlich | G11B 5/59688 360/75 |
| 6,606,214 B1 | * | 8/2003 | Liu | G11B 5/5521 360/77.02 |
| 6,633,451 B1 | * | 10/2003 | Chainer | G11B 5/59633 360/75 |

(Continued)

FOREIGN PATENT DOCUMENTS

JP 2022-144844 10/2022

*Primary Examiner* — Peter Vincent Agustin
(74) *Attorney, Agent, or Firm* — Knobbe, Martens, Olson & Bear, LLP

(57) ABSTRACT

According to one embodiment, in a disk device, a controller adjusts a correction value of a radial position of servo track according to a ratio between amplitude of a correction value spectrum of a radial position of the servo track at a first circumferential position and at a second circumferential position when positioning control of the head to a target data track is performed on a basis of servo information read from the servo track. At the first circumferential position, a relative speed of a change in the radial position of the servo track with respect to a radial position of the target data track becomes a first speed. At the second circumferential position, a relative speed of a change in the radial position of the servo track with respect to the radial position of the target data track becomes a second speed.

20 Claims, 14 Drawing Sheets

(56) References Cited

U.S. PATENT DOCUMENTS

| | | |
|---|---|---|
| 6,989,956 B2 | 1/2006 | Takaishi et al. |
| 7,251,097 B2 | 7/2007 | Hanson et al. |
| 7,450,336 B1 | 11/2008 | Wang et al. |
| 8,077,428 B1 | 12/2011 | Chen et al. |
| 8,120,871 B1 | 2/2012 | Sutardja et al. |
| 8,189,286 B1 * | 5/2012 | Chen .................. G11B 5/59655 360/77.04 |
| 11,521,647 B2 | 12/2022 | Ogawa et al. |
| 2003/0072101 A1 * | 4/2003 | Takeichi ............ G11B 5/59633 360/75 |
| 2004/0123025 A1 * | 6/2004 | Chainer ............. G11B 5/59633 711/112 |
| 2007/0195443 A1 * | 8/2007 | Suzuki .................... G11B 5/86 |
| 2022/0301587 A1 * | 9/2022 | Ogawa ............... G11B 5/59627 |

* cited by examiner

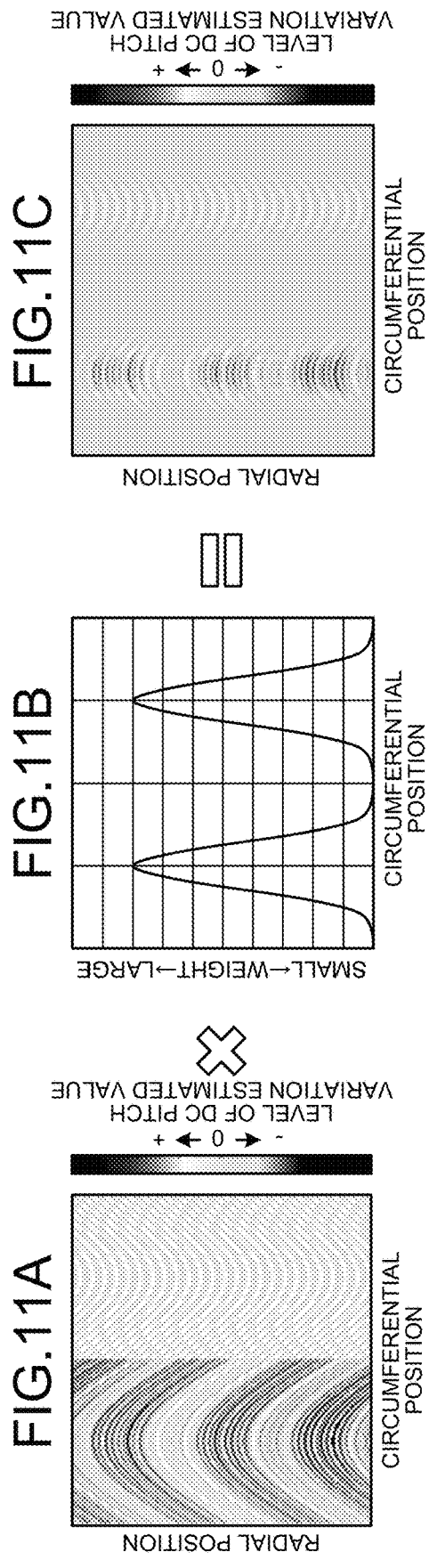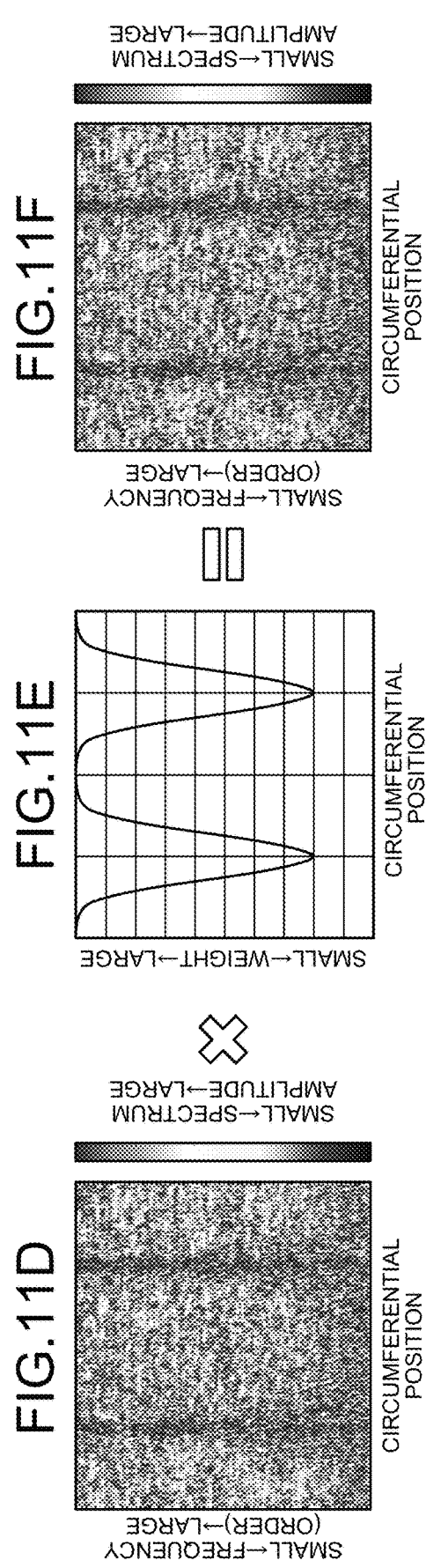

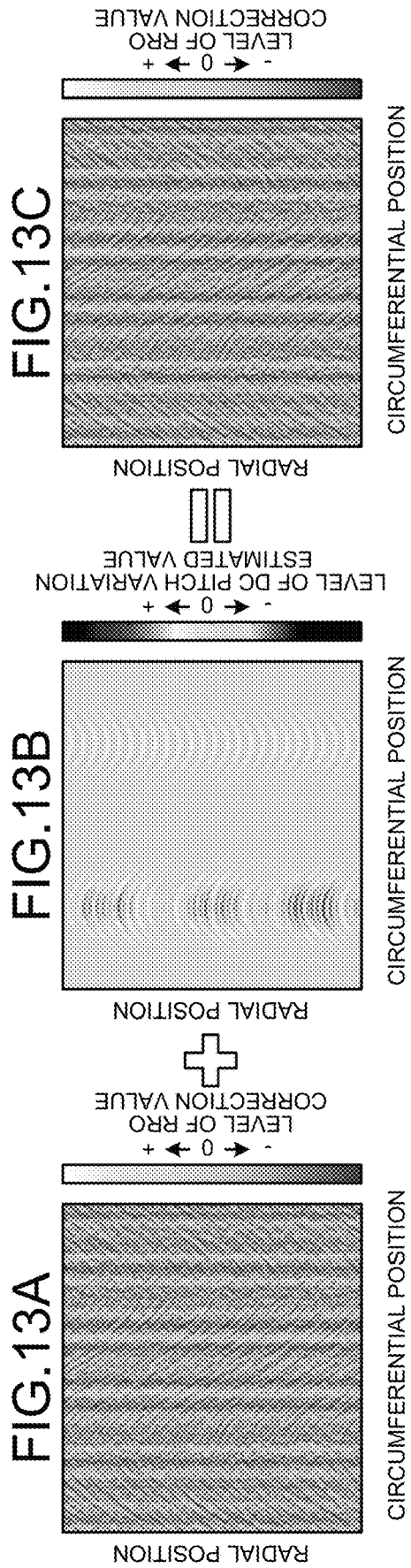

DISK DEVICE

CROSS-REFERENCE TO RELATED APPLICATIONS

This application is based upon and claims the benefit of priority from Japanese Patent Application No. 2022-149286, filed on Sep. 20, 2022; the entire contents of which are incorporated herein by reference.

FIELD

Embodiments described herein relate generally to a disk device.

BACKGROUND

In a disk device having a head and a disk, a plurality of servo tracks and a plurality of data tracks are provided in the disk. The disk device performs positioning control of the head to a target data track on the basis of servo information read from the servo track. At this time, in the disk device, it is desirable to appropriately correct a radial position of the servo track and improve accuracy of the positioning control of the head.

BRIEF DESCRIPTION OF THE DRAWINGS

FIGS. 11A to 11F are diagrams illustrating weighting for the DC pitch variation amount and inverse weighting for the RRO correction value radial spectrum in the embodiment;

FIGS. 13A to 13C are diagrams illustrating combining of the DC pitch variation amount with the RRO correction value in the embodiment.

DETAILED DESCRIPTION

In general, according to one embodiment, there is provided a disk device including a head, a disk and a controller. In the disk, a plurality of servo tracks is provided concentrically with respect to a first center and a plurality of data tracks is provided concentrically with respect to a second center different from the first center. The controller adjusts a correction value of a radial position of the servo track according to a ratio between amplitude of a correction value spectrum of a radial position of the servo track at a first circumferential position and amplitude of a correction value spectrum of a radial position of the servo track at a second circumferential position when positioning control of the head to a target data track is performed on a basis of servo information read from the servo track. At the first circumferential position, a relative speed of a change in the radial position of the servo track with respect to a radial position of the target data track becomes a first speed. At the second circumferential position, a relative speed of a change in the radial position of the servo track with respect to the radial position of the target data track becomes a second speed.

Exemplary embodiments of a disk device will be explained below in detail with reference to the accompanying drawings. The present invention is not limited to the following embodiments.

Embodiment

A disk device according to an embodiment includes a head and a disk, and a plurality of servo tracks and a plurality of data tracks are each provided in the disk, but is provided with a contrivance for improving accuracy in positioning control of the head to a target data track.

Figure 1:
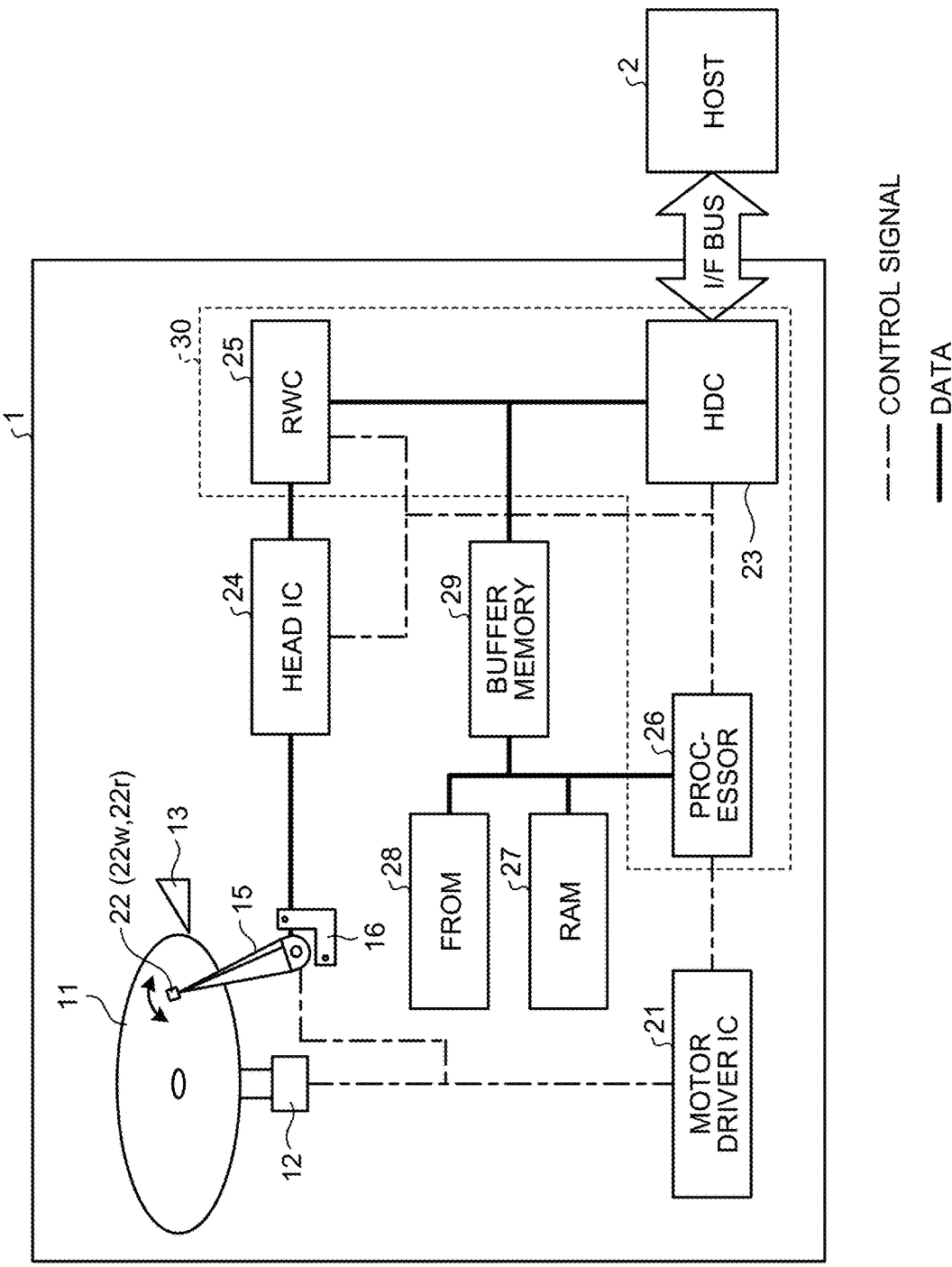
FIG. 1 is a diagram illustrating a configuration of a disk device according to an embodiment.

For example, a disk device 1 is configured as illustrated in FIG. 1. FIG. 1 is a diagram illustrating a configuration of the disk device 1.

The disk device 1 is connected to a host 2 via a communication medium. The communication medium may be a wired communication line such as an I/F bus wiring. The disk device 1 may receive an access command such as a write command or a read command from the host 2, and may transmit a response corresponding to the command to the host 2.

The disk device 1 includes a disk 11 having a magnetic layer formed on a surface thereof. The disk 11 is a substantially disk-type recording medium, and may be a magnetic disk or a magneto-optical disk. The disk device 1 writes information to the disk 11 or reads information from the disk 11 according to the access command.

Data is written and read via the head 22. Specifically, in addition to the disk 11, the disk device 1 includes a spindle motor 12, a ramp 13, an actuator arm 15, a voice coil motor (VCM) 16, a motor driver integrated circuit (IC) 21, a head 22, a hard disk controller (HDC) 23, a head IC 24, a read/write channel (RWC) 25, a processor 26, a RAM 27, a flash read only memory (FROM) 28, and a buffer memory 29.

The disk 11 is rotated at a predetermined rotation speed by the spindle motor 12 attached coaxially. The spindle motor 12 is driven by the motor driver IC 21.

The processor 26 controls the rotation of the spindle motor 12 and the rotation of the VCM 16 via the motor driver IC 21.

The head 22 is moved relative to a surface of the disk 11. Then, the head 22 writes and reads information to and from the surface of the disk 11 using a write head $22w$ and a read head $22r$ provided therein.

The head 22 is attached to a distal end of the actuator arm 15. The head 22 is moved in a radial direction of the disk 11 with respect to the surface of the disk 11 by the VCM 16 driven by the motor driver IC 21. Further, since the disk 11 is rotating, the head 22 is moved relative to the surface of the disk 11 in a circumferential direction of the disk 11.

When the rotation of the disk 11 is stopped or the like, the head 22 is moved onto the ramp 13. The ramp 13 is configured to hold the head 22 at a position spaced apart from the disk 11.

The head IC 24 amplifies and outputs a signal read from the disk 11 by the head 22 at the time of reading, and supplies the signal to the RWC 25. Further, at the time of writing, the head IC 24 amplifies a signal corresponding to data to be written supplied from the RWC 25 and supplies the amplified signal to the head 22.

The HDC 23 performs control of transmission and reception of data with the host 2 via the I/F bus, control of the buffer memory 29, error correction processing of read data, and the like.

The buffer memory 29 is used as a buffer for data transmitted to and received from the host 2. For example, the buffer memory 29 is used to temporarily store data to be written to the disk 11 or data read from the disk 11.

The buffer memory 29 includes, for example, a volatile memory capable of high-speed operation. The type of the memory constituting the buffer memory 29 is not limited to a specific type. The buffer memory 29 can be constituted by, for example, a dynamic random access memory (DRAM), a static random access memory (SRAM), or a combination thereof.

The RWC 25 modulates data to be written supplied from the HDC 23 and supplies the modulated data to the head IC 24. Further, the RWC 25 demodulates a signal read from the disk 11 and supplied from the head IC 24, and outputs the demodulated signal to the HDC 23 as digital data.

The processor 26 is, for example, a central processing unit (CPU). The RAM 27, the flash read only memory (FROM) 28, and the buffer memory 29 are connected to the processor 26.

The FROM 28 is a nonvolatile memory. The FROM 28 stores firmware (program data), various operation parameters, and the like. Note that the firmware may be stored in the disk 11.

The RAM 27 includes, for example, a DRAM, an SRAM, or a combination thereof. The RAM 27 is used as an operation memory by the processor 26. The RAM 27 is used as an area in which firmware is loaded and an area in which various types of management data are held.

The processor 26 performs overall control of the disk device 1 according to the firmware stored in the FROM 28 or the disk 11. For example, the processor 26 loads the firmware from the FROM 28 or the disk 11 to the RAM 27, and executes control of the motor driver IC 21, the head IC 24, the RWC 25, the HDC 23, and the like according to the loaded firmware.

Note that a configuration including the RWC 25, the processor 26, and the HDC 23 may also be regarded as a controller 30. In addition to these components, the controller 30 may include other components (for example, the RAM 27, the FROM 28, the buffer memory 29, the RWC 25, and the like).

In addition, a firmware program may be stored in the disk 11. Further, some or all of the functions of the processor 26 may be implemented by a hardware circuit such as a field-programmable gate array (FPGA) or an application specific integrated circuit (ASIC).

Figure 2:
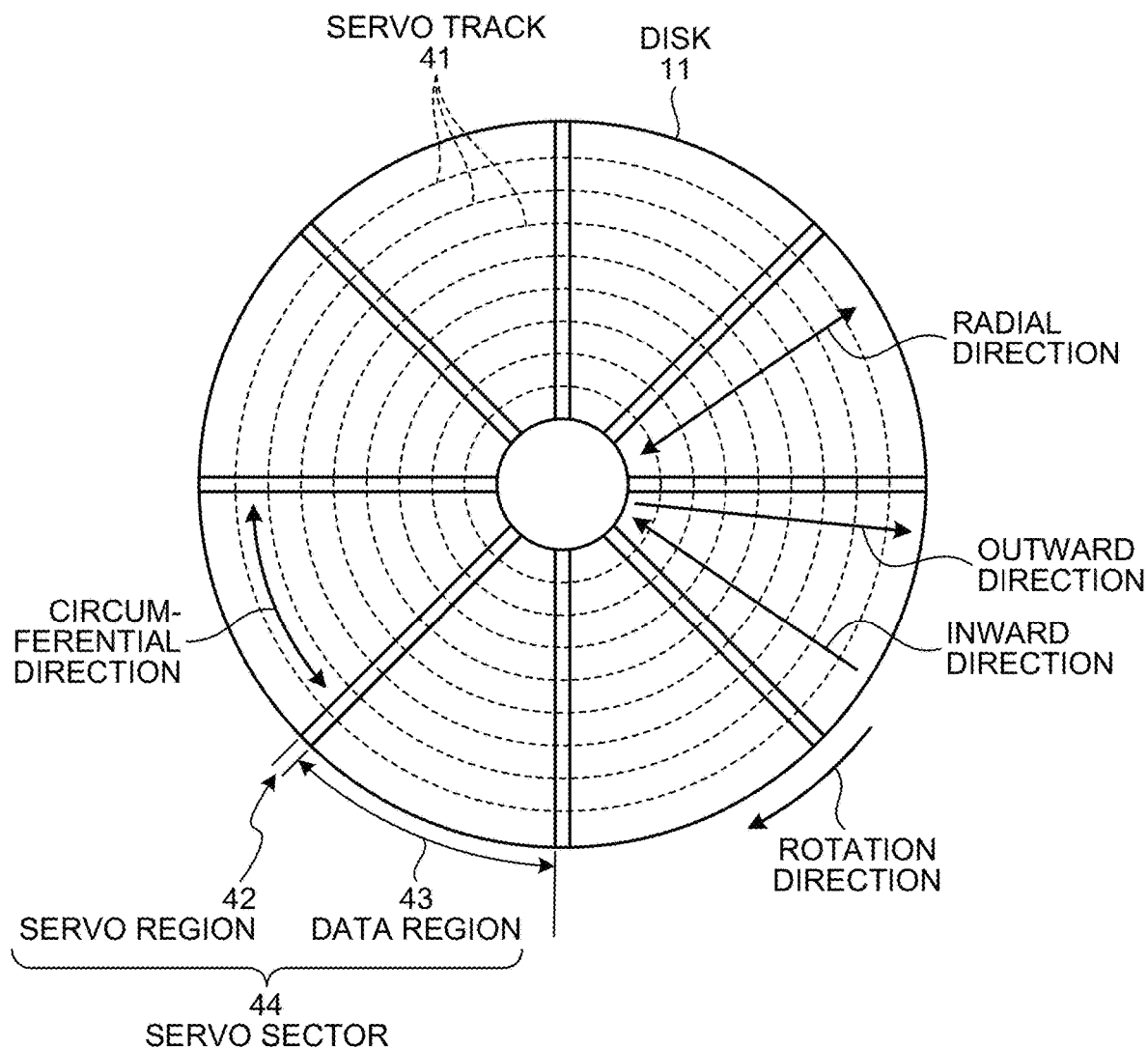
FIG. 2 is a plan view illustrating a configuration of a disk according to the embodiment.

FIG. 2 is a schematic view illustrating an example of a configuration of the disk 11 of the first embodiment. Note that, in the radial direction of the disk 11, a direction from an outer peripheral side to an inner peripheral side of the disk 11 is referred to as an inward direction. A direction from the inward peripheral side to the outer peripheral side of the disk 11 is referred to as an outward direction. Further, FIG. 2 illustrates an example of the rotation direction of the disk 11.

In the manufacturing process, servo information is written to the disk 11. FIG. 2 illustrates servo regions 42 arranged radially as an example of arrangement of servo regions in which the servo information is written. The servo information will be described later.

A data region 43 in which data can be written is provided between the servo regions 42. One servo region 42 and one data region 43 subsequent to the servo region 42 constitute a servo sector 44. In the radial direction of the disk 11, a plurality of concentric servo tracks 41 provided by the servo information is set.

Figure 3:
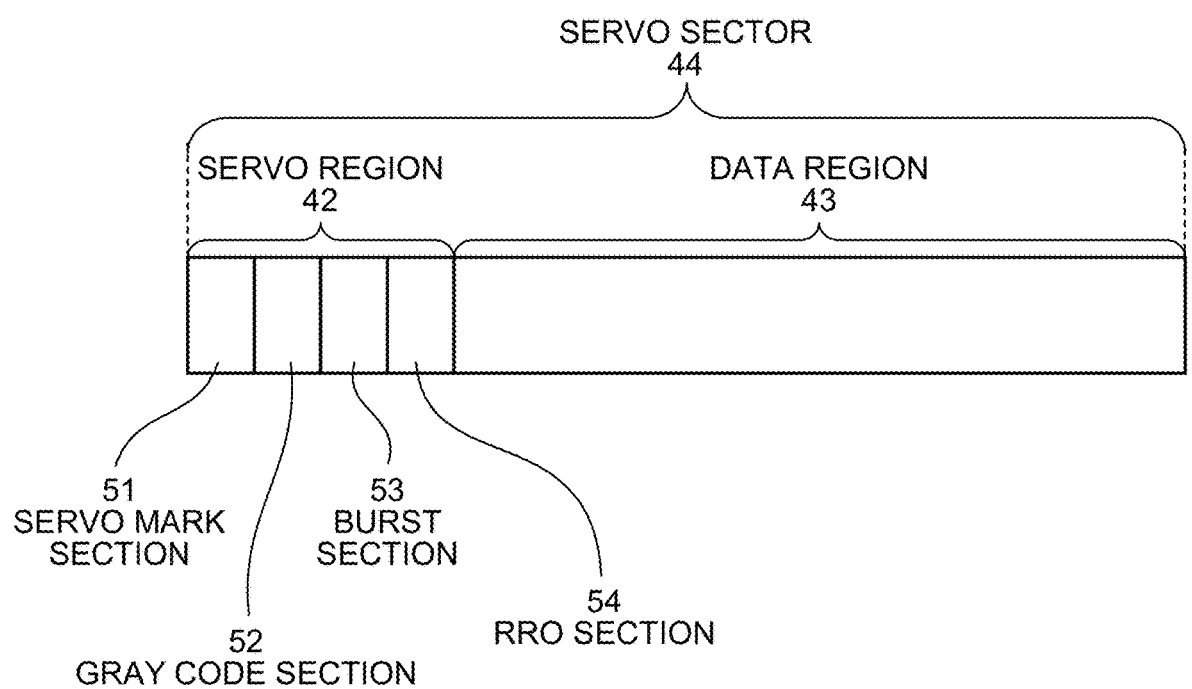
FIG. 3 is a diagram illustrating a configuration of a servo sector according to the embodiment.

FIG. 3 is a schematic diagram illustrating an example of a configuration of the servo region 42. As illustrated in the drawing, the servo region 42 constituting one servo sector 44_together with the data region 43 includes a servo mark section 51, a gray code section 52, a burst section 53, and an RRO section 54.

A servo mark is recorded in the servo mark section 51. The servo mark indicates the head of the servo region 42 in the circumferential direction of the disk 11.

A gray code is recorded in the gray code section 52. The gray code is digital data indicating the number of the servo track.

In the burst section 53, servo burst data is recorded. The servo burst data is data for detecting the distance of the position of the head 22 from a track center. The servo burst data provides a track center of each servo track, in other words, each servo track. The servo burst data includes, for example, an area pattern having a plurality of phases in which phases are shifted from each other.

RRO correction data is recorded in the RRO section 54. The position of the servo track 41 provided by the servo burst data may be distorted from an ideal circular shape (for example, a virtual circle). In such a case, the radial position of the servo track 41 includes an error due to a radial runout synchronized with the rotation of the disk 11. This runout is referred to as the RRO. That is, the RRO is a rotation synchronization component of the amount of positional deviation in the radial direction of the servo track 41, and has a primary component and a secondary or higher component.

Figure 4:
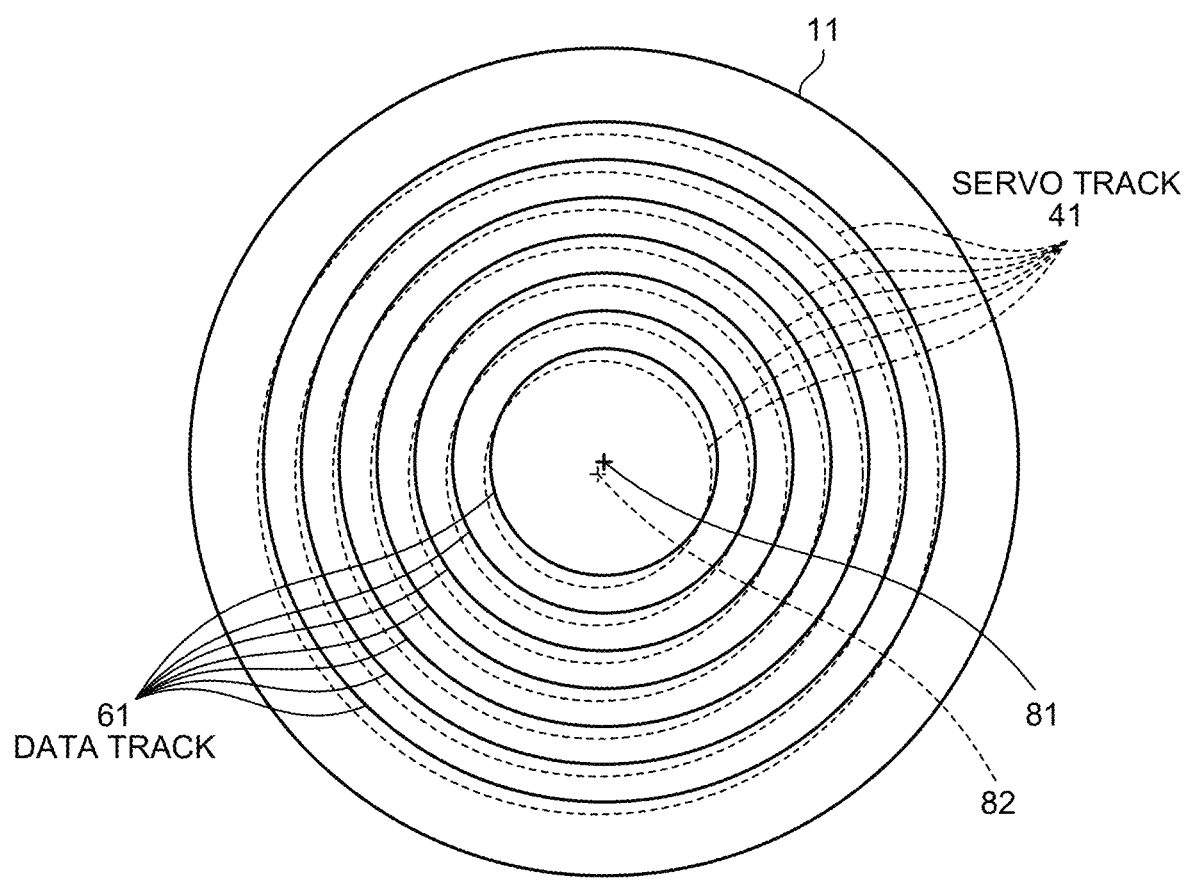
FIG. 4 is a view illustrating a center of a servo track and a center of a data track according to the embodiment.

In the manufacturing process, a servo mark, a gray code, and servo burst data are written to the disk 11 by, for example, a servo writer or self-servo write (SSW). A disk 11 is installed in a case for mounting. At this time, a center 82 of the servo track 41 illustrated in FIG. 4 is eccentric from a rotation center 81 of the spindle motor 12 according to the installation state of the disk 11. The rotation center 81 of the spindle motor 12 can also be referred to as a rotation center 81 of the disk 11. The plurality of servo tracks 41 is a plurality of concentric circles centered on the center 82.

Thus, a data track 61 is provided to draw an ideal circular orbit around the rotation center 81. The ideal circular orbit is also referred to as a virtual circular orbit. The virtual circular orbit corresponds to primary RRO. The plurality of data tracks 61 is a plurality of concentric virtual circles centered on the center 81. By defining each data track 61 in a virtual circular orbit, the influence of the primary component of the RRO can be reduced, but the secondary or higher component of the RRO still remains. Accordingly, as described later, RRO correction data corresponding to the secondary or higher components of the RRO is calculated, and the RRO correction data obtained by the calculation is written to the RRO section 54 (see FIG. 3).

When the data track 61 indicated by a solid line in FIG. 4 is used as a reference, the servo track 41 indicated by a dotted line in FIG. 4 changes in the radial position along a first-order sine wave with one round being one cycle, for example.

Figure 5:
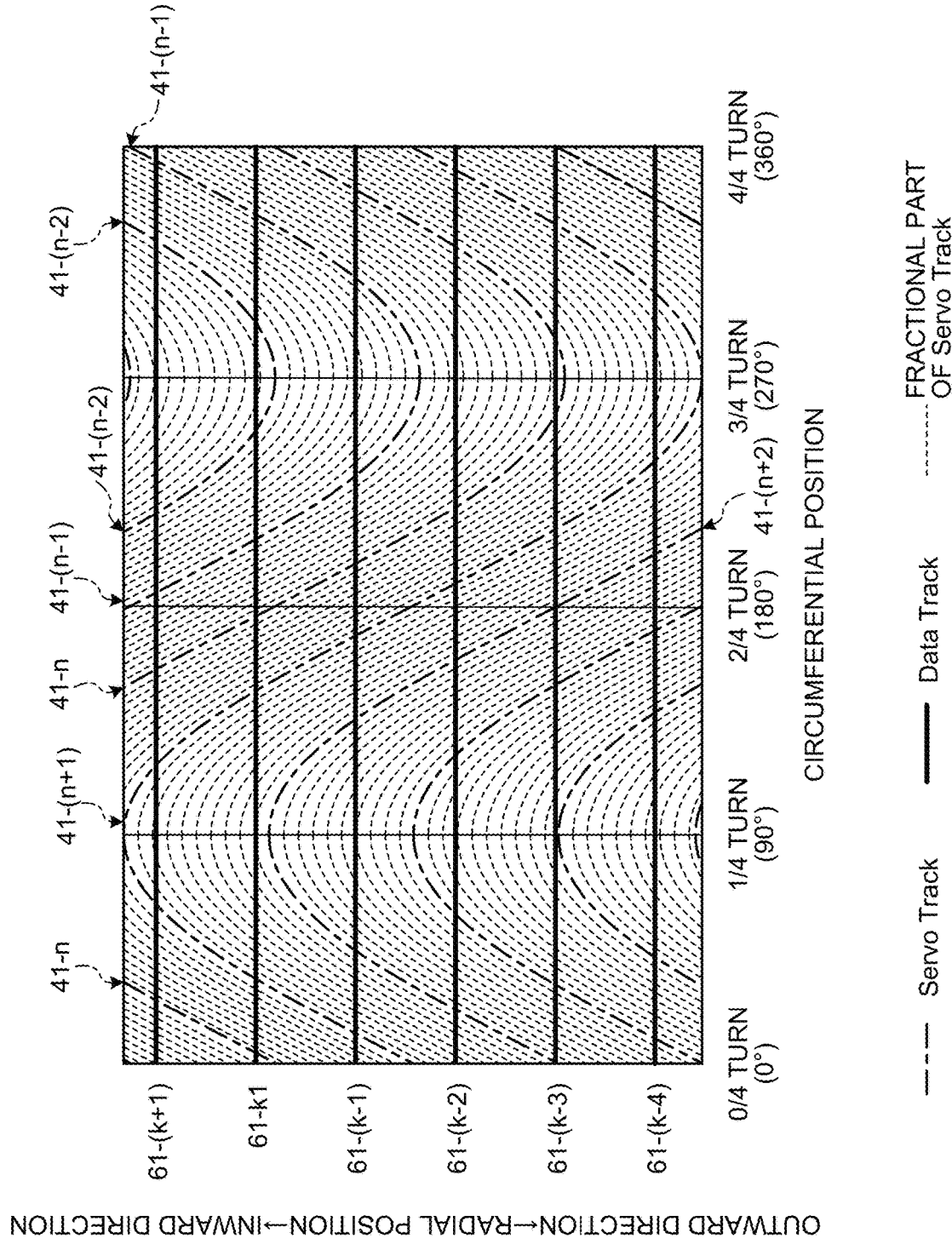
FIG. 5 is a diagram illustrating a change in a radial position of the data track with respect to a radial position of the servo track according to the embodiment.

In this regard, FIG. 5 illustrates one round of the data track 61 being flat in the circumferential direction. FIG. 5 is a diagram illustrating a change in the radial position of the data track 61 with respect to the radial position of the servo track 41. In FIG. 5, the vertical axis represents the radial position, and the horizontal axis represents the circumferential position. An upper side in FIG. 5 indicates an inward direction (see FIG. 2), and a lower side in FIG. 5 indicates an outward direction. In FIG. 5, the track center of the data track 61 is indicated by a solid line, the track center of the servo track 41 is indicated by a one-dot chain line, and the fractional part of the servo track 41 is indicated by a dotted line. The fractional part of the servo track 41 corresponds to a radial position offset from the track center of the servo track 41.

When the data track 61 indicated by a solid line in FIG. 5 is used as a reference, the radial position of the servo track 41 indicated by a one-dot chain line in FIG. 5 changes along a sine wave with one round being one cycle, for example. Similarly, with reference to the data track 61 indicated by a solid line in FIG. 5, the position of the fractional part of the servo track 41 indicated by a dotted line in FIG. 5 changes in the radial position along a sine wave with one round being one cycle, for example.

There is a possibility that, on the servo track 61, a track pitch is written with a deviation on average from the ideal track pitch under the influence of an external force offset or the like at the time of servo writing. This average track pitch deviation is referred to as DC pitch variation. The position between the servo tracks is calculated from the servo burst data, but since the servo burst data is normalized between the servo tracks, the DC pitch variation is basically pitch variation that cannot be detected from the servo burst data. However, for example, by performing tracking control such that the servo track 61 is positionally changed in the radial direction along a sine wave with one round being one cycle as illustrated in FIG. 5, it is possible to generate a circumferential position where the DC pitch variation can be corrected as the RRO.

The ease of correction of the DC pitch variation varies depending on the circumferential position. Of the plurality of data tracks 61-(k−4) to 61-(k+1) illustrated in FIG. 5, the data track 61-k is assumed to be the target data track. When the head 22 is position-controlled to the target data track 61-k, the head 22 moves from left to right in FIG. 5 along the target data track 61-k, for example. The target data track 61-k sequentially straddles the servo tracks 41-n, 41-(n+1), 41-(n+2), 41-(n+1), 41-n, 41-(n−1), 41-(n−2), and 41-(n−1) with a first-order sine wave per round along the virtual circular orbit. Accordingly, when the head 22 travels circumferentially through the data track 61-k, the radial speed of the servo track 41 relative to the track center of the data track 61-k varies depending on the circumferential position of the head 22.

For example, at circumferential positions of 0/4, 2/4 round, and 4/4 round (that is, circumferential positions corresponding to phases 0°, 180°, and 360° of the sine wave), the data track 61-k approaches, crosses, or moves away from the servo track 41 at a radial speed greater than zero. At this time, in the servo sectors at the circumferential positions of 0/4 round, 2/4 round, and 4/4 round, when there is a DC pitch variation in the servo track, an error between a change in the radial position of the servo track expected from the speed of the head 22 and a change in the radial position calculated from the servo information is always generated by a certain amount and appears as the RRO. That is, the DC pitch variation is easily seen as the RRO. Thus, the DC pitch variation may be easily corrected by the RRO correction at the circumferential positions of 0/4 round, 2/4 round, and 4/4 round.

However, at the circumferential positions of 1/4 round and 3/4 round (that is, the circumferential position corresponding to the phases 90° and 270° of the sine wave), the data track 61-k is substantially parallel to the servo track 41, and the data track 61-k runs side by side in the circumferential direction at a radial speed of substantially zero on the servo track 41. At this time, in the servo sectors at the circumferential positions of 1/4 round and 3/4 round, since the change in the servo track radial position expected from the speed of the head 22 is zero, the DC pitch fluctuation is hardly seen as the RRO in the change in the radial position calculated from the servo information. Thus, it is difficult to correct the DC pitch variation by the RRO correction at the circumferential positions of 1/4 round and 3/4 round. Consequently, the accuracy of the positioning control of the head 22 decreases, and there is a possibility that the adjacent data tracks 61-(k+1) and 61-(k−1) are overwritten and erased during write processing.

Accordingly, the controller 30 estimates the RRO correction value at the circumferential position where the DC pitch variation is hardly seen as the RRO from the RRO correction value at the circumferential position where the DC pitch variation is easily seen as the RRO, combines a DC pitch variation estimated value estimated according to the estimation result with the original RRO correction value, and adjusts the RRO correction value. The controller 30 may adjust the RRO correction value at the radial position of the servo track on the basis of amplitude of the RRO correction value radial spectrum at the circumferential position that is hardly seen as the RRO and amplitude of the RRO correction value radial spectrum at the circumferential position that is easily seen as the RRO. The head 22 is positioned on the target data track 61 using an RRO correction value after adjustment. Thus, the accuracy of the positioning control of the head 22 using the RRO correction value can be improved, and a margin of offset write can be improved.

Figure 6:
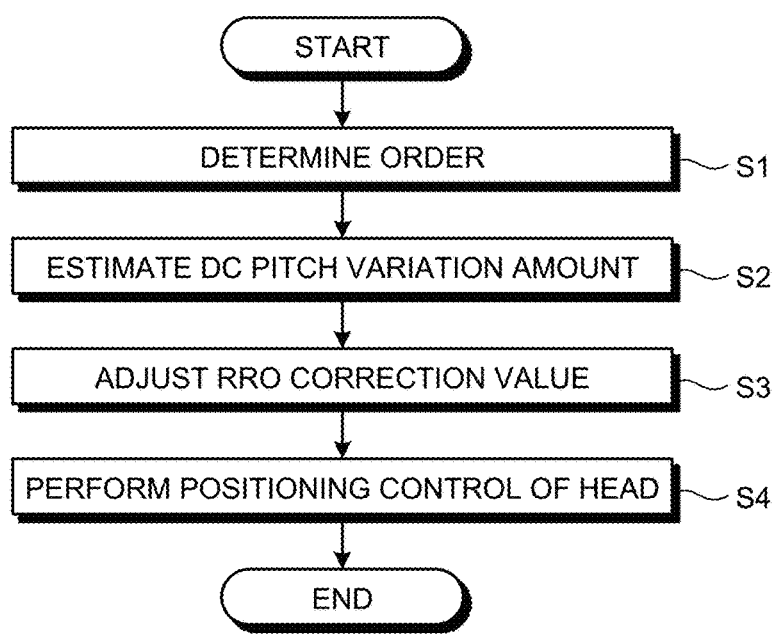
FIG. 6 is a flowchart illustrating an operation of a controller according to the embodiment.

As illustrated in FIG. 6, the controller 30 may adjust the RRO correction value in consideration of the DC pitch variation. FIG. 6 is a flowchart illustrating an operation of the controller 30.

A change in the radial direction of the RRO correction value includes a pitch variation component of the servo track 41 with respect to the radial position of the target data track 61. This pitch variation includes a higher order component in the radial direction. The controller 30 determines the order to be adjusted among a plurality of orders of components in the change in the radial position of the servo track 41 with respect to the radial position of the target data track 61 (S1). The order to be adjusted is set as the estimated DC pitch variation. The controller 30 obtains a ratio between amplitude of a correction value radial spectrum at the radial position of the servo track 41 at a circumferential position CP1 and amplitude of a correction value radial spectrum at the radial position of the servo track 41 at a circumferential position CP2, and determines the order to be adjusted according to the obtained ratio.

The circumferential position CP1 is a circumferential position at which the DC pitch variation is more easily seen as the RRO than the circumferential position CP2. The circumferential position CP1 is a position where the relative speed of the change in the radial position of the servo track 41 with respect to the radial position of the target data track 61 becomes a speed v1. The circumferential position CP1 may be a position where the relative speed of the change in the radial position of the servo track 41 with respect to the radial position of the target data track 61 becomes the maximum speed. The circumferential position CP1 may be a circumferential position of 0/4 round, 2/4 round, or 4/4 round (that is, circumferential position corresponding to the phase 0°, 180°, or 360° of the sine wave).

The circumferential position CP2 is a circumferential position where the DC pitch variation is hardly seen as the RRO as compared to the circumferential position CP1. The circumferential position CP2 is a position where the relative speed of the change in the radial position of the servo track 41 with respect to the radial position of the target data track 61 becomes a speed v2. The circumferential position CP2 may be a position where the relative speed of the change in the radial position of the servo track 41 with respect to the radial position of the target data track 61 becomes substantially zero. The position where the relative speed becomes substantially zero may also be referred to as a position where the target data track 61 and the servo track 41 are substantially parallel. The circumferential position CP2 may be a 1/4 round circumferential position or a 3/4 round circumferential position (that is, the circumferential position corresponding to the phase 90° or 270° of the sine wave).

For example, the controller 30 acquires a reproduction signal of the servo burst data via the head 22 while moving the head 22 along the plurality of data tracks 61. The reproduction signal of the servo burst data is acquired every time the head 22 passes through the burst section 53. That is, the controller 30 acquires the reproduction signal of the servo burst data in units of servo sectors 44.

The controller 30 obtains the radial position of the servo track 41 on the basis of the reproduction signal of the servo burst data, and calculates the amount of positional deviation of the obtained radial position from the ideal radial position. The controller 30 calculates the RRO of the servo track 41 from the calculated positional deviation amount, and sets the RRO of the servo track 41 obtained by the calculation as the RRO correction value. The controller 30 may calculate the RRO correction value in units of the servo sectors 44.

Figure 7:
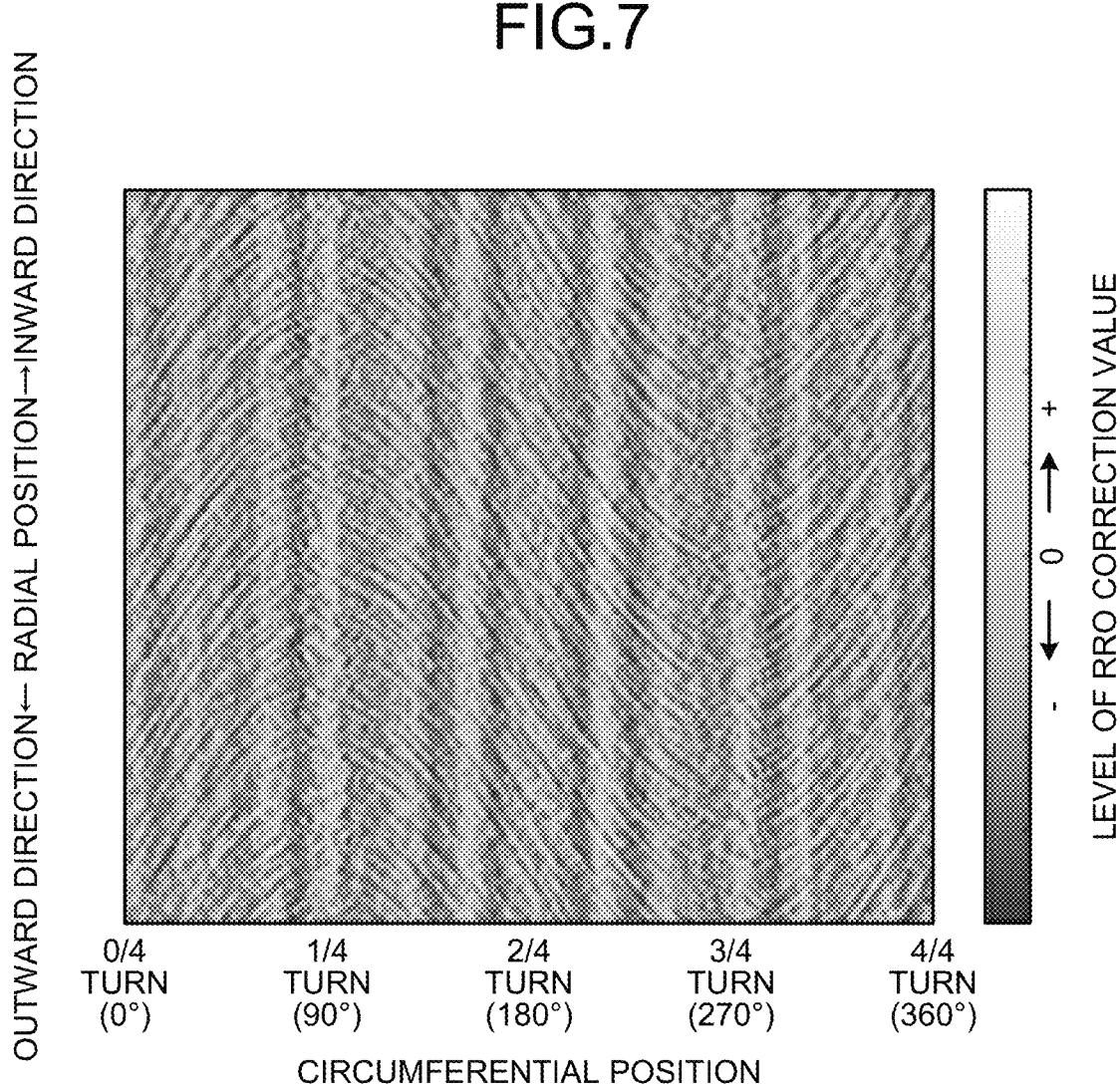
FIG. 7 is a diagram illustrating a distribution of an RRO correction value with respect to a circumferential position in the embodiment.

Thus, the controller 30 can obtain the distribution of the RRO correction value as illustrated in FIG. 7. FIG. 7 is a diagram illustrating a distribution of the RRO correction value with respect to the radial position and the circumferential position. In FIG. 7, the vertical axis represents the radial position of the disk 11, and the horizontal axis represents the circumferential position of the disk 11. An upper side in FIG. 7 indicates an inward direction (see FIG. 2), and a lower side in FIG. 7 indicates an outward direction.

The circumferential position is indicated by how far it has traveled in the circumferential direction with respect to one round along the track center of the data track 61. For example, an initial position is indicated by 0/4 round, a position advanced by 1/4 round of one turn is indicated by 1/4 round, a position advanced by 2/4 round of one turn is indicated by 2/4 round, a position advanced by 3/4 round of one turn is indicated by 3/4 round, and a position advanced by 4/4 round of one turn is indicated by 4/4 round. Further, how much advance is made in the circumferential direction with respect to one round from the fact that the servo track 41 indicates a change of one cycle in a sinusoidal shape in one cycle with the track center of the data track 61 as a reference (see FIG. 5) corresponds to the phase of the sine wave. For example, the position of 0/4 round may be rephrased as a position of 0°, the position of 1/4 round may be rephrased as a position of 90°, the position of 2/4 round may be rephrased as a position of 180°, the position of 3/4 round may be rephrased as a position of 270°, and the position of 4/4 round may be rephrased as a position of 360°.

In FIG. 7, the level of the RRO correction value is indicated by color shading. In FIG. 7, it is illustrated that the level of the RRO correction value decreases as the color becomes darker and closer to black, and the amplitude increases as the color becomes lighter and closer to white.

Figure 8:
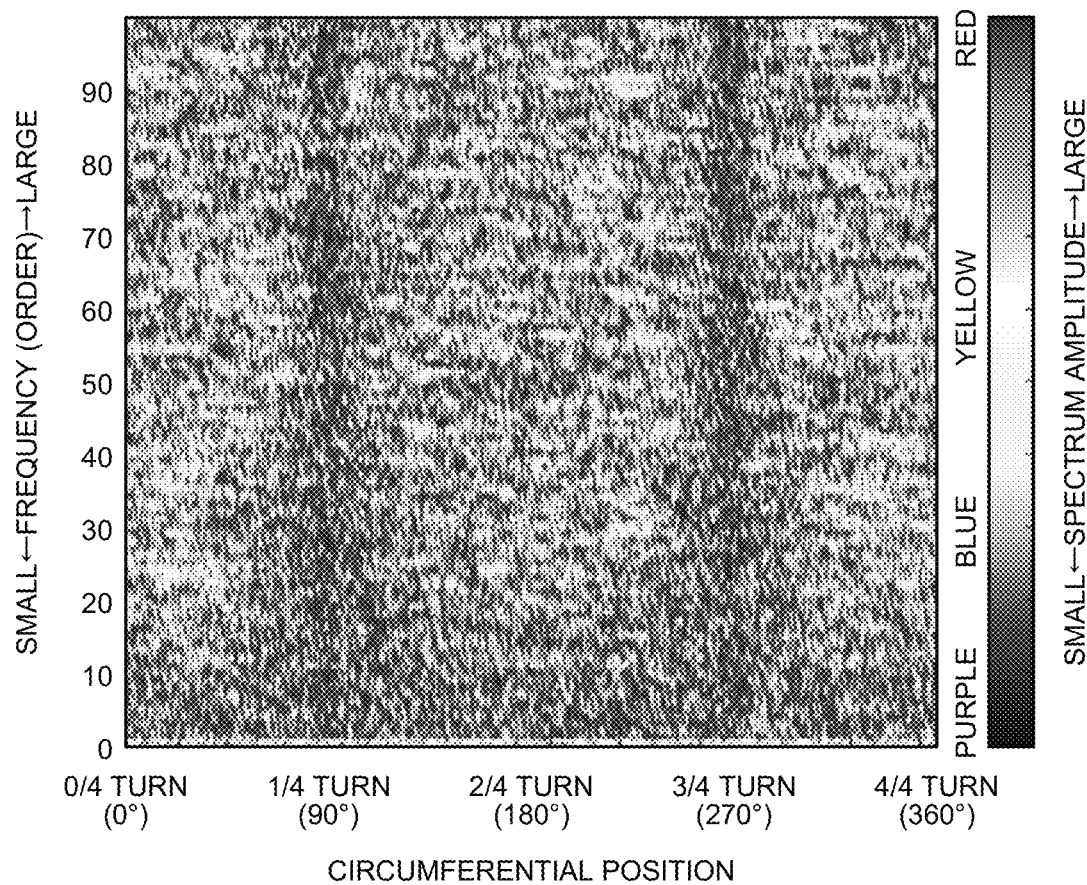
FIG. 8 is a diagram illustrating a distribution of an RRO correction value radial spectrum with respect to the circumferential position in the embodiment.

The controller 30 performs a discrete Fourier transform (DFT) on the RRO correction values of the plurality of data tracks 61 including the target data track 61 and the data track 61 adjacent thereto in the radial direction. Thus, the controller 30 extracts a plurality of orders of components from the RRO correction value and obtains a distribution of the RRO correction value radial spectrum as illustrated in FIG. 8 as an extraction result. FIG. 8 is a diagram illustrating the distribution of the RRO correction value radial spectrum with respect to the circumferential position. In FIG. 8, the vertical axis represents the radial frequency of the RRO, and the horizontal axis represents the circumferential position of the disk 11.

The radial frequency of the RRO indicates how many track cycles the corresponding component fluctuates, and means the order of the pitch variation. For example, when the number of data tracks in the disk 11 is N, the order n of the pitch variation may be a value from 0 to N−1.

In FIG. 8, the amplitude of the RRO correction value radial spectrum should be indicated in color, but is indicated in grayscale for convenience of illustration. FIG. 8 illustrates that the closer the color is to the grayscale gradation corresponding to purple, the smaller the amplitude of the RRO correction value radial spectrum is, and the closer the color is to the grayscale gradation corresponding to red, the larger the amplitude of the RRO correction value radial spectrum is.

Using the distribution of the RRO correction value radial spectrum illustrated in FIG. 8, the controller 30 obtains average amplitude $|Aavg(n)|$ of the nth-order correction value radial spectrum at a plurality of circumferential positions CP1_1 and CP1_2. The circumferential position CP1_1 may be a 0/4 round circumferential position (that is, the circumferential position corresponding to the phase of 0° of the sine wave), and the circumferential position CP1_2 may be a 2/4 round circumferential position (that is, the circumferential position corresponding to the phase of 180° of the sine wave). For each of n=0 to N−1, the controller 30 may add and average the amplitude of the nth-order correction value spectrum at the circumferential position CP1_1 and the amplitude of the nth-order correction value spectrum at the circumferential position CP1_2, take an absolute value thereof, and then calculate the average amplitude $|Aavg(n)|$.

The controller 30 obtains amplitude $|A2\_1(n)|$ and $|A2\_2(n)|$ of the nth-order correction value radial spectra at a plurality of circumferential positions CP2_1 and CP2_2, respectively. The circumferential position CP2_1 may be a 1/4 round circumferential position (that is, the circumferential position corresponding to the phase of 90° of the sine wave), and the circumferential position CP2_2 may be a 3/4 round circumferential position (that is, the circumferential position corresponding to the phase of 270° of the sine wave). The controller 30 may take an absolute value of the amplitude of the nth-order correction value radial spectrum at the circumferential position CP2_1 for each of n=0 to N−1, and obtain the amplitude |A2_1(n)|. The controller 30 may take an absolute value of the amplitude of the nth-order correction value radial spectrum at the circumferential position CP2_2 for each of n=0 to N−1, and obtain the amplitude |A2_2(n)|.

The controller 30 obtains a radial spectrum amplitude ratio R2_1(n)=|Aavg(n)|/|A2_1(n)| corresponding to the circumferential position CP2_1 for each of the orders n=0 to N−1. The controller 30 obtains a spectrum amplitude ratio R2_2(n)=|Aavg(n)|/|A2_2(n)| corresponding to the circumferential position CP2_2 for each of n=0 to N−1. Thus, the controller 30 obtains a calculation result as illustrated in FIG. 9.

Figure 9:
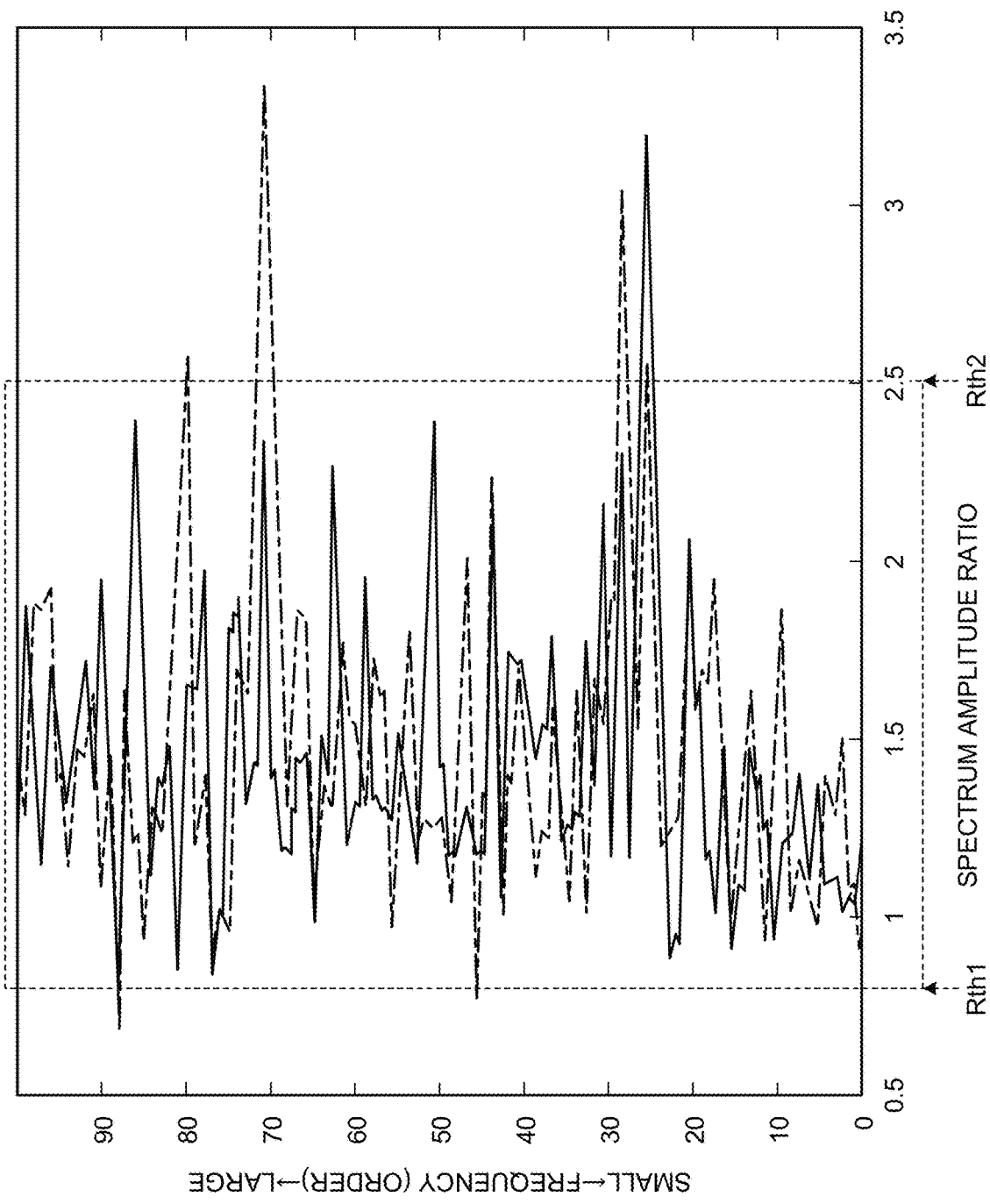
FIG. 9 is a diagram illustrating calculation results of amplitude ratios of the RRO correction value radial spectrum for a plurality of circumferential positions in the embodiment.

FIG. 9 is a diagram illustrating calculation results of amplitude ratios R2_1(n) and R2_2(n) of the RRO correction value radial spectrum for a plurality of circumferential positions. In FIG. 9, the vertical axis represents the frequency of the RRO, and the horizontal axis represents the magnitude of the spectrum amplitude ratio. The frequency of the RRO corresponds to the order of the DC pitch variation. In FIG. 9, the radial spectrum amplitude ratio R2_1(n) corresponding to the circumferential position CP2_1 is indicated by a one-dot chain line, and the radial spectrum amplitude ratio R2_2(n) corresponding to the circumferential position CP2_2 is indicated by a solid line.

Among the orders n=0 to N−1 of the pitch variation, the controller 30 regards the order in which the spectrum amplitude ratio R(n) is out of an appropriate range as the order having a large deviation (error) from an appropriate value, regards the order as the DC pitch variation, and sets the order as an estimation target to be estimated. The appropriate range may be provided by a lower limit threshold value Rth1 and an upper limit threshold value Rth2 as indicated by a dotted line in FIG. 9. The lower limit threshold value Rth1 and the upper limit threshold value Rth2 may be experimentally determined in advance.

In the case of FIG. 9, the controller 30 specifies the orders n=28, 45, 70, 79, and 87 as orders out of the appropriate range for the radial spectrum amplitude ratio R2_1(n) indicated by the one-dot chain line. The controller 30 specifies the order n=25 as the order n out of the appropriate range for the radial spectrum amplitude ratio R2_2(n) indicated by the solid line. The controller 30 determines the order in which the DC pitch variation should be estimated as n=25, 28, 45, 70, 79, and 87.

Returning to FIG. 6, the controller 30 generates relationship information indicating the relationship between a correction value and the radial position of the servo track 41 for the order determined in S1. The controller 30 estimates the variation amount (DC pitch variation amount) of the radial position of the servo track 41 at the circumferential position CP2 where the DC pitch variation is hardly seen as the RRO using the generated the relationship information (S2).

The controller 30 may estimate the variation amount (DC pitch variation amount) of the radial position of the servo track 41 at the circumferential position CP2 using the variation amount of the radial position of the servo track 41 at the circumferential position CP1 at which the DC pitch variation is easily seen as the RRO.

Here, the RRO correction value is provided in a form corresponding to the data track 61, but the DC pitch variation is obtained corresponding to the servo track 41. Thus, the controller 30 acquires a servo target position corresponding to the RRO correction value. The controller 30 may acquire, as the servo target position, a detailed position by a burst signal of the burst section 53 with respect to the radial position of the track center of the servo track 41. The controller 30 may functionalize the DC pitch variation amount using the amplitude of the RRO correction value radial spectrum and the servo target position.

For example, the controller 30 may generate amplitude information |Vavg(n)| as expressed in Mathematical Expression 1 with the order n determined in S1 as an estimation target. Thus, the controller 30 prepares to reflect the amplitude of the RRO correction value radial spectrum at the circumferential position CP1 on the estimated value of the DC pitch variation amount at the circumferential position CP2.

$$|V_{avg}(n)| = \begin{cases} 0, & n \neq \text{Estimation target} \\ |A_{avg}(n)|, & n = \text{Estimation target} \end{cases} \quad \text{Mathematical Expression 1}$$

As expressed in Mathematical Expression 1, the amplitude information |Vavg(n)| represents the amplitude for each order n of the pitch variation. The amplitude information |Vavg(n)| is a function that is substantially equal to the amplitude |Aavg(n)| at the circumferential position CP1 when n is the order of the estimation target (the order regarded as the DC pitch variation), and is zero when n is an order other than the estimation target (the order not regarded as the DC pitch variation).

In the case of FIG. 9, the controller 30 may generate the amplitude information |Vavg(n)| as a function that is substantially equal to the amplitude |Aavg(n)| when the order n=25, 28, 45, 70, 79, and 87, and is zero when the order n=0 to 24, 26, 27, 29 to 44, 46 to 69, 71 to 78, 80 to 86, and 88 to 100.

When the estimated value of the DC pitch variation amount is $c_t(r)$, the estimated value $c_t(r)$ is a function (relationship information) indicating the relationship between the correction value and the radial position of the servo track 41. The controller 30 may estimate the estimated value $c_t(r)$ as in the following Mathematical Expression 2.

$$c_t(r) = \frac{1}{N}\sum_{n=0}^{N-1}|V_{avg}(n)|\cos\left(\frac{2\pi n}{N}G_t(r) + \phi_{avg}(n)\right) \quad \text{Mathematical Expression 2}$$

In Mathematical Expression 2, n is the order of the pitch variation. r is identification information (for example, data track number) of the data track 61, and r=0, 1, 2, . . . , N−1. t is identification information (for example, servo sector number) of the servo sector 44, and t=0, 1, 2, 3, . . . , MaxSct−1. The data track 61 having the identification information r is denoted as 61_r, and the servo sector 44 having the identification information t is denoted as 44_t. The estimated value $c_t(r)$ is an estimated value of the DC pitch variation amount for the servo sector 44_t and the data track 61_r.

As expressed in Mathematical Expression 2, the estimated value $c_t(r)$ is expressed by using the amplitude information |Vavg(n)|, phase information Φavg(n), and servo target position information $G_t(r)$. That is, as expressed in Mathematical Expressions 1 and 2, the estimated value $c_t(r)$ estimates the DC pitch variation amount of the circumferential position CP2 by causing a coefficient corresponding to the servo target position information $G_t(r)$ and the phase information Φavg(n) to act on the amplitude |Aavg(n)| of the correction value radial spectrum of the circumferential position CP1 for the order n of the estimation target.

The phase information Φavg(n) represents the phase of the sine wave corresponding to the circumferential position for each order n of the DC pitch variation. The phase may be an average value of the phase corresponding to the circumferential position CP1_1 (for example, a position of 0/4 round) and the phase corresponding to the circumferential position CP1_2 (for example, a position of 2/4 round).

The servo target position information $G_t(r)$ may be given by the following Mathematical Expression 3.

$$G_t(r) = \frac{g_t(r) - g_{avg}(0)}{g_{avg}(N-1) - g_{avg}(0)}(N-1) \qquad \text{Mathematical Expression 3}$$

In Mathematical Expression 3, $g_{avg}(r)$ represents the servo target position with respect to the data track 61_r. The servo target position may be an average value of the servo target position corresponding to the circumferential position CP1_1 and the servo target position corresponding to the circumferential position CP1_2. $g_{avg}(0)$ represents the servo target position with respect to data track 61_0. $g_{avg}(N-1)$ represents the servo target position with respect to the data track 61_ (N−1).

As expressed in Mathematical Expression 3, the servo target position information $G_t(r)$ represents the servo target position corresponding to the servo sector 44_t and the data track 61_r by normalization based on $g_{avg}$.

As expressed in Mathematical Expressions 1 to 3, the estimated value $c_t(r)$ approximately estimates the DC pitch variation amount at the circumferential position CP2 by obtaining a value obtained by radially projecting the amplitude |Aavg(n)| of the correction value radial spectrum at the circumferential position CP1 according to the angle of the sum of a phase angle with respect to the center of the disk 11 and an inclination angle according to the servo target position. The estimated DC pitch variation amount will be referred to as a DC pitch variation estimated value.

Figure 10:
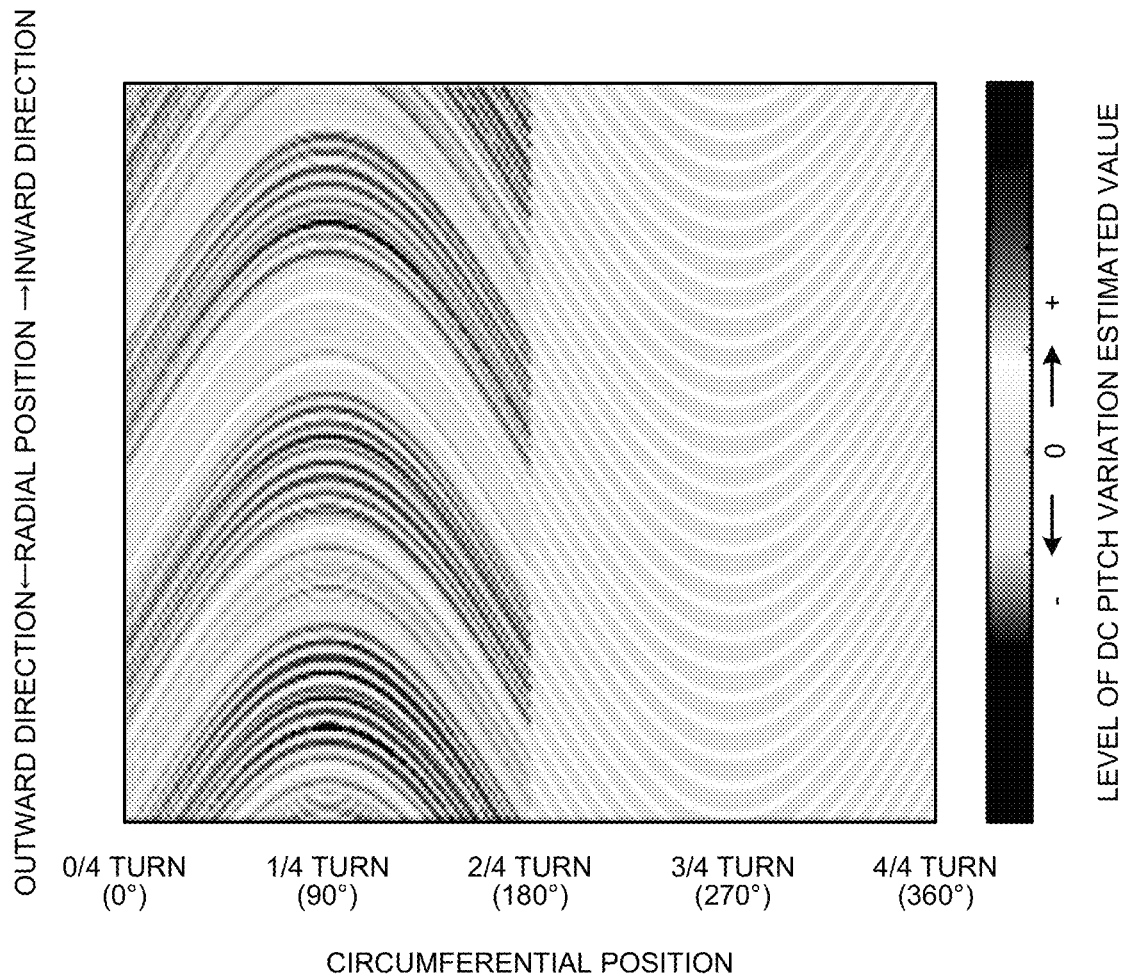
FIG. 10 is a diagram illustrating a distribution of a DC pitch variation amount with respect to the circumferential position in the embodiment.

The controller 30 may obtain a distribution of the DC pitch variation estimated value as illustrated in FIG. 10 by obtaining the DC pitch variation estimated value $c_t(r)$ as expressed in Mathematical Expressions 1 to 3. FIG. 10 is a diagram illustrating a distribution of the DC pitch variation estimated value with respect to the radial position and the circumferential position. In FIG. 10, the vertical axis represents the radial position, and the horizontal axis represents the circumferential position. An upper side in FIG. 10 indicates an inward direction (see FIG. 2), and a lower side in FIG. 10 indicates an outward direction. The DC pitch variation estimated value at each position includes a component estimated for the order n (for example, n=25, 28, 45, 70, 79, and 87) of the estimation target.

Returning to FIG. 6, the controller 30 adjusts the RRO correction value by combining the DC pitch variation estimated value obtained by Mathematical Expression 2 with the RRO correction value (S3).

For example, the DC pitch variation estimated value obtained by Mathematical Expression 2 is the value of all the servo sectors 44_0 to 44_ (MaxSct−1), but what should be adjusted is the value of the servo sectors 44 near the circumferential position CP2_1 (for example, a position of 1/4 round) and the circumferential position CP2_2 (for example, a position of 3/4 round). Accordingly, the controller 30 multiplies the DC pitch variation estimated value $c_t(r)$ expressed by Mathematical Expression 2 by a weight function $w_t$ expressed by the following Mathematical Expression 4.

$$W_t = 0.8\{\sin(2\pi t/\text{MaxSct})\}^6 \qquad \text{Mathematical Expression 4}$$

The weight function $w_t$ expressed in Mathematical Expression 4 is a function in which the weight selectively increases near the circumferential position CP2_1 and the circumferential position CP2_2. Thus, the controller 30 amplifies the levels of the estimated values of the servo sectors 44 near the circumferential positions CP2_1 and CP2_2 and attenuates the levels of the estimated values of the other servo sectors 44. Equivalently, the controller 30 extracts the estimated value of the servo sector 44 near the circumferential positions CP2_1 and CP2_2 from the DC pitch variation estimated value $c_t(r)$ expressed by Mathematical Expression 2.

For example, the controller 30 may obtain the weighted DC pitch variation estimated value illustrated in FIG. 11C by multiplying a distribution of the DC pitch variation estimated value $c_t(r)$ illustrated in FIG. 11A by the weight function $w_t$ illustrated in FIG. 11B. The DC pitch variation estimated value includes components of the order n of the estimation target.

FIGS. 11A to 11C are diagrams illustrating weighting on the DC pitch variation estimated value. FIG. 11A is a diagram illustrating a distribution of the DC pitch variation estimated value with respect to the radial position and the circumferential position, similarly to FIG. 10. The DC pitch variation estimated value at each position includes a component of the order n of the estimation target. FIG. 11B is a diagram illustrating the weight of the weight function $w_t$ for the circumferential position, and illustrates that the weight is selectively large near the circumferential position CP2_1 (for example, a position of 1/4 round) and the circumferential position CP2_2 (for example, a position of 3/4 round). FIG. 11C is a diagram illustrating a result of weighting on the DC pitch variation estimated value, and illustrates a distribution of the weighted DC pitch variation estimated value with respect to the radial position and the circumferential position. FIG. 11C illustrates that the DC pitch variation estimated value is selectively weighted at the circumferential position CP2_1 and the circumferential position CP2_2.

Further, in order to average the original correction value radial spectrum and the DC pitch variation estimated value, the controller 30 multiplies the original correction value radial spectrum by the weight function $1-w_t$ of an inverse characteristic for the order n of the estimation target. Multiplying the weight function $1-w_t$ of the inverse characteristic will be referred to as inverse weighting.

For example, the controller 30 may obtain the inversely weighted RRO correction value radial spectrum illustrated in FIG. 11F by multiplying the distribution of the RRO correction value radial spectrum illustrated in FIG. 11D by the weight function $1-w_t$ of the inverse characteristic illustrated in FIG. 11E.

FIGS. 11D to 11F illustrate the inverse weighting on the RRO correction value radial spectrum. FIG. 11D is a diagram illustrating the distribution of the RRO correction value radial spectrum with respect to the radial position and the circumferential position, similarly to FIG. 8. The RRO correction value radial spectrum at each position includes a component of each order n. FIG. 11E is a diagram illustrating the weight of the weight function $1-w_t$ of the inverse characteristic with respect to the circumferential position, and illustrates that the weight is selectively small near the circumferential position CP2_1 (for example, a position of 1/4 round) and the circumferential position CP2_2 (for example, a position of 3/4 round). FIG. 11F is a diagram illustrating the result of the inverse weighting on the RRO correction value radial spectrum, and illustrates that the component of each order n of the RRO correction value radial spectrum is selectively inversely weighted and attenuated at the circumferential position CP2_1 and the circumferential position CP2_2.

Figure 12B:
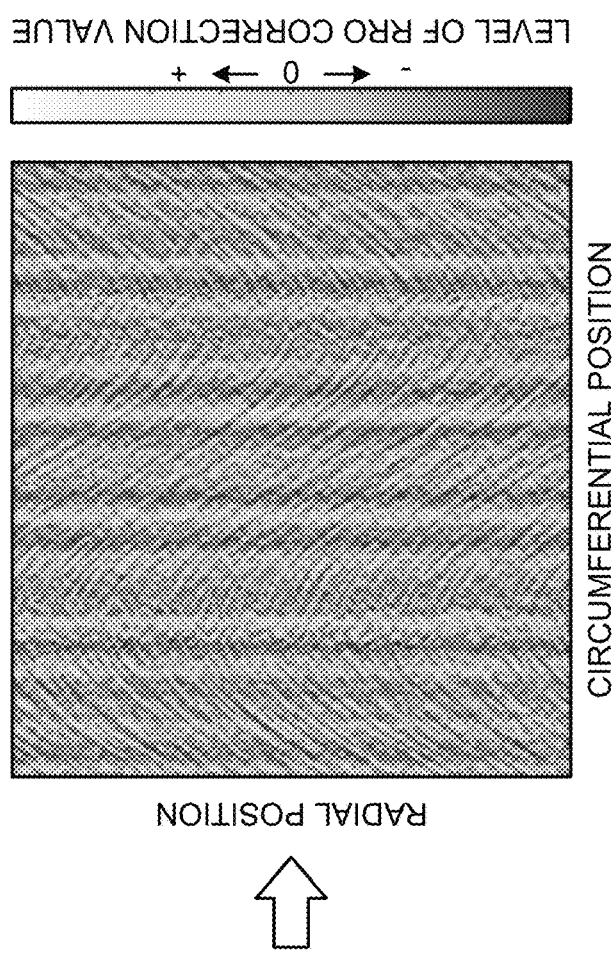
FIGS. 12A and 12B are diagrams illustrating conversion of an RRO correction value radial spectrum into an RRO correction value in an embodiment.
Figure 12A:
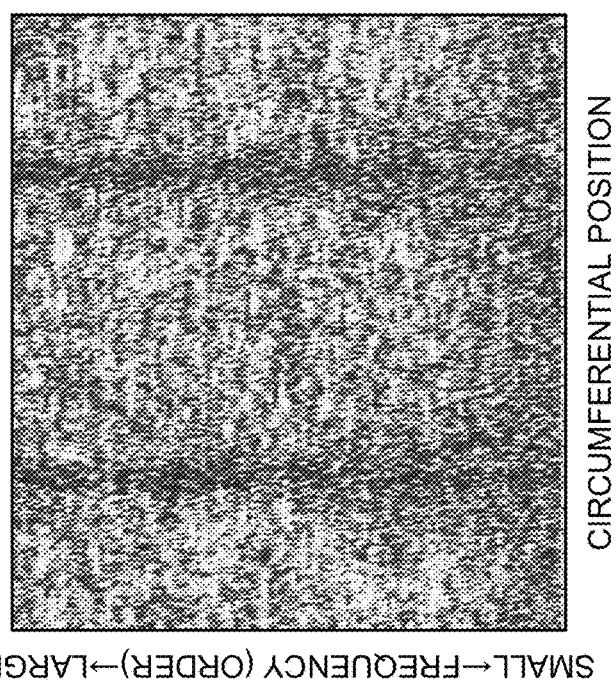

The inversely weighted RRO correction value radial spectrum illustrated in FIG. 12A is substantially the same as the inversely weighted RRO correction value radial spectrum illustrated in FIG. 11F. The controller 30 may obtain the inversely weighted RRO correction value illustrated in FIG. 12B by performing an inverse discrete Fourier transform (inverse DFT) the inverse weighted RRO correction value radial spectrum illustrated in FIG. 12A. FIG. 12B illustrates a distribution of inversely weighted RRO correction values with respect to the radial position and the circumferential position.

The distribution of the inversely weighted RRO correction values illustrated in FIG. 13A is substantially the same as the distribution of the inversely weighted RRO correction values illustrated in FIG. 12B. The distribution of the weighted DC pitch variation estimated value illustrated in FIG. 13B is substantially the same as the distribution of the weighted DC pitch variation estimated value illustrated in FIG. 11C. The controller 30 combines the distribution of the inversely weighted RRO correction values illustrated in FIG. 13A with the distribution of the weighted DC pitch variation estimated value illustrated in FIG. 13B. For example, the controller 30 may combine the distribution of the inversely weighted RRO correction value illustrated in FIG. 13A with the distribution of the weighted DC pitch variation estimated value illustrated in FIG. 13B by adding them at each two-dimensional position. Thus, the controller 30 can obtain the combined RRO correction value as the RRO correction value after adjustment. For example, the controller 30 may obtain a distribution of the RRO correction value after adjustment as illustrated in FIG. 13C. The controller 30 may write the RRO correction value after adjustment in the RRO section 54 (see FIG. 3) of the servo region 42 of each servo sector 44.

Returning to FIG. 6, the controller 30 performs the positioning control of the head 22 to the target data track 61 on the basis of the servo information read from the servo track 41 (S4). At this time, since the servo information includes the RRO correction value after adjustment, the controller 30 can perform the positioning control of the head 22 with high accuracy, and resistance to offset write may be improved.

The offset write is to write data by offsetting the head 22 from the track center of the target data track 61. Normally, a process of prohibiting write is performed when a certain amount of off-track is detected so that data of the data track adjacent to the target data track 61 is not erased by the offset write. However, if there is a DC pitch variation between the servo tracks 41 corresponding to the adjacent data track 61, there is a deviation between a correct servo off-track amount and an off-track amount calculated from the servo burst data, and thus adjacent data may be erased. In this case, a read error occurs in the data track adjacent to the target data track. Therefore, if the DC pitch variation may be corrected, the off-track amount can be correctly detected, and appropriate write prohibition can be performed, so that the accuracy of data protection of the adjacent data track may be improved at the time of the offset write of the target data track.

Figure 14A:
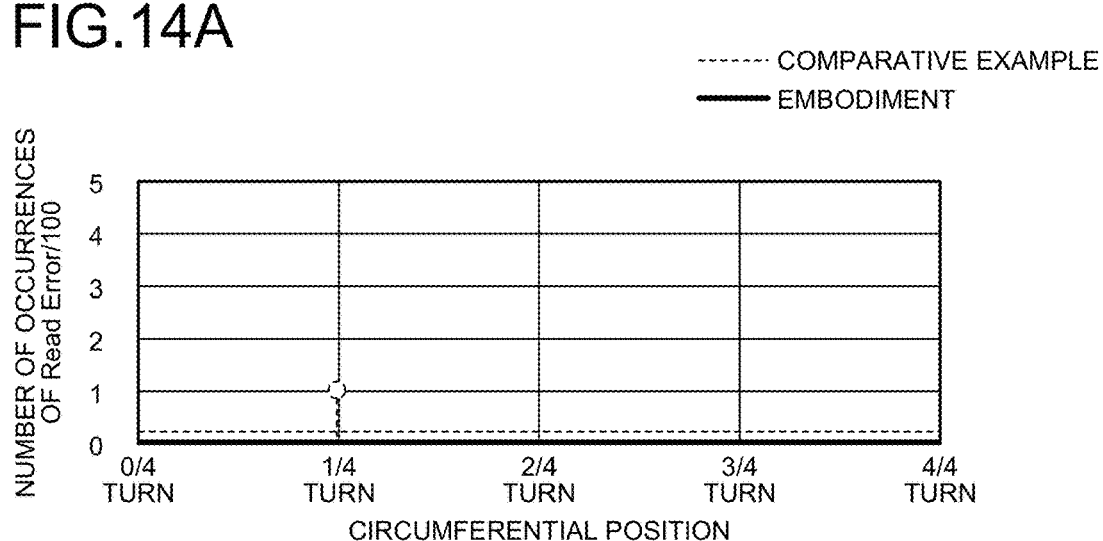
FIGS. 14A to 14C are diagrams illustrating characteristics of offset write in the embodiment.
Figure 14B:
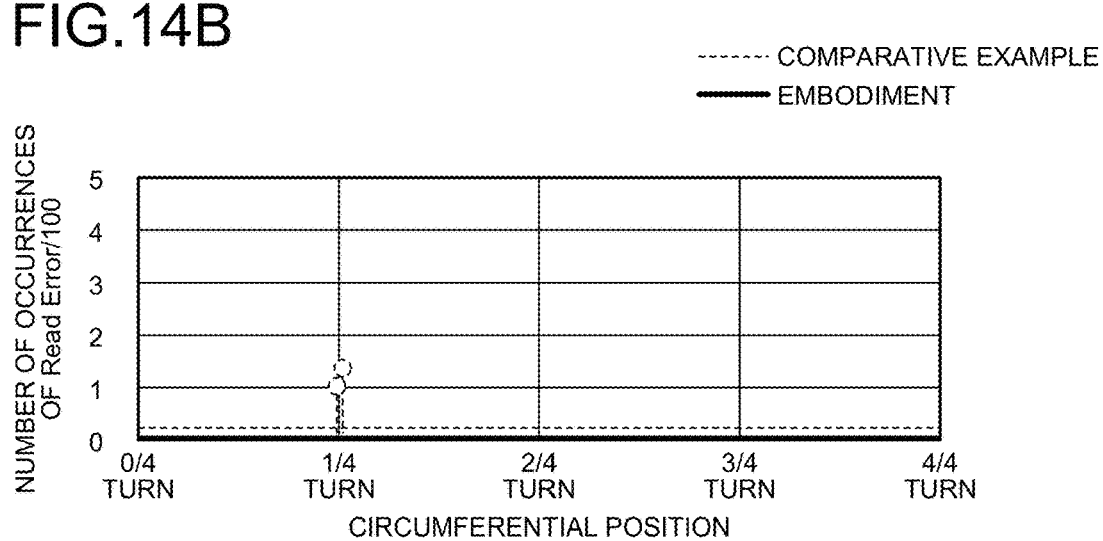
Figure 14C:
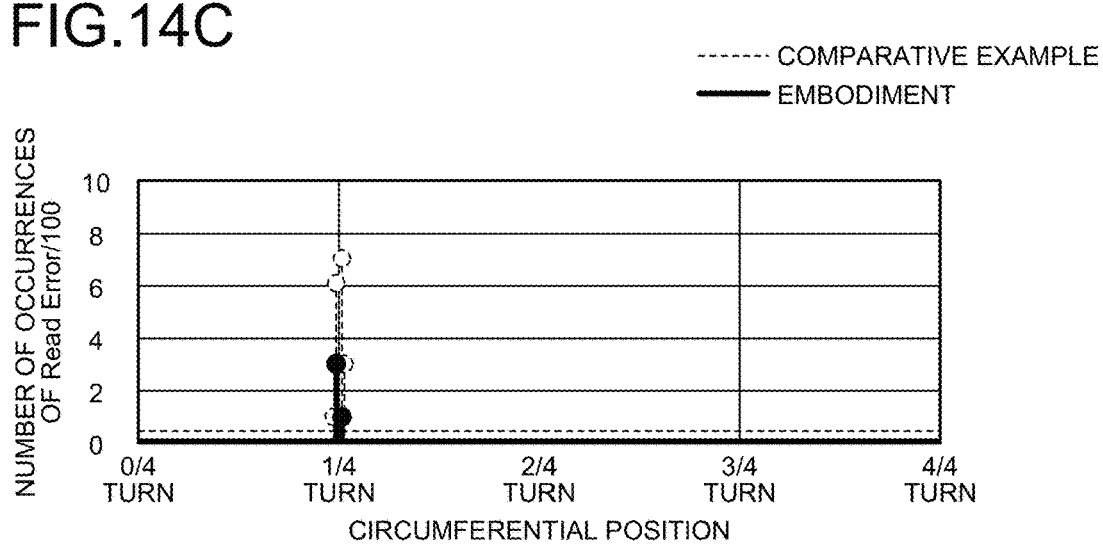

For example, the number of read errors in a case where an operation of writing data by offsetting the head 22 from the track center of the target data track 61-$k$ (see FIG. 5) to the data track 61-(k−1) side and reading the data track 61-(k−1) is alternately repeated 100 times is as illustrated in FIGS. 14A to 14C.

FIGS. 14A to 14C are diagrams illustrating characteristics of the offset write. FIG. 14A illustrates a case where the offset amount is $\Delta OF1$ (for example, 1 mm), FIG. 14B illustrates a case where the offset amount is $\Delta OF2$ ($>\Delta OF1$, for example, 1.5 mm), and FIG. 14C illustrates a case where the offset amount is $\Delta OF3$ ($>\Delta OF2$, for example, 2 mm). In each of FIGS. 14A to 14C, the vertical axis represents the number of occurrences of read errors, and the horizontal axis represents the circumferential position of the disk 11.

In FIGS. 14A to 14C, a case where the positioning control of the head 22 is performed by the servo information not including the RRO correction value after adjustment is indicated by a dotted line as a comparative example, and a case where the positioning control of the head 22 is performed by the servo information including the RRO correction value after adjustment is indicated by a solid line as the present embodiment. As illustrated in FIGS. 14A to 14C, when the offset amount is increased from $\Delta OF1 \rightarrow \Delta OF2$ ($>\Delta OF1$)$\rightarrow \Delta OF3$ ($>\Delta OF2$), the read error occurs from the offset amount $\Delta OF1$ at the circumferential position of the 1/4 round in the comparative example, whereas the read error does not occur up to the offset amount $\Delta OF2$ and the read error occurs from the offset amount $\Delta OF3$ in the present embodiment. Thus, it is confirmed that the resistance to the offset write may be improved in the present embodiment as compared with the comparative example.

As described above, in the present embodiment, in the disk device 1, the controller 30 adjusts the RRO correction value of the servo track 41 according to the ratio between the amplitude of the RRO correction value radial spectrum of the servo track 41 at the circumferential position CP1 and the amplitude of the RRO correction value radial spectrum of the servo track 41 at the circumferential position CP2. The circumferential position CP1 may be a position where the relative speed of the change in the radial position of the servo track 41 with respect to the radial position of the target data track 61 becomes the speed v1. The circumferential position CP2 may be a position where the relative speed of the change in the radial position of the servo track 41 with respect to the radial position of the target data track 61 becomes the speed v2 ($<$v1). Thus, the DC pitch variation at the circumferential position CP2 is hardly seen as the RRO than at the circumferential position CP1. On the other hand, the controller 30 may estimate and adjust a shortage of the RRO correction value at the circumferential position CP2 according to the RRO correction value at the circumferential position CP1. Thus, in the disk device 1, the positioning control of the head 22 may be performed with high accuracy using the RRO correction value after adjustment, and the resistance to the offset write may be improved.

Further, in the present embodiment, in the disk device 1, the controller 30 determines the order to be adjusted among the plurality of orders included in the pitch variation as the DC pitch variation according to the amplitude ratio of the correction value radial spectrum. The controller 30 generates the relationship information indicating the relationship between the RRO correction value radial spectrum and the radial position of the servo track 41 for the determined order. The controller 30 estimates the DC pitch variation amount of the servo track 41 at the circumferential position CP2 using the relationship information. The controller 30 applies weighting that amplifies with respect to the circumferential position CP2 to the estimated DC pitch variation amount, and applies inverse weighting that attenuates with respect to the circumferential position CP2 to the RRO correction value of the servo track 41. The controller 30 combines the inversely weighted RRO correction value with the weighted DC pitch variation amount to obtain an adjusted RRO correction value. Thus, the controller 30 may estimate and adjust the shortage of the RRO correction value at the circumferential position CP2 according to the RRO correction value at the circumferential position CP1.

For example, it is conceivable to adjust the original RRO correction value by DFT calculating the RRO correction value for several data tracks in the track direction, considering a noticeable peak as a DC pitch variation, and complementing the amplitude. In this case, when a significant peak is not observed in the RRO correction value, the amplitude of the DC pitch variation is difficult to be complemented, and it becomes difficult to adjust the original RRO correction value.

On the other hand, in the present embodiment, the controller 30 may estimate and adjust the shortage of the RRO correction value at the circumferential position CP2 according to the RRO correction value at the circumferential position CP1. Accordingly, even when a significant peak is not observed in the RRO correction value, the RRO correction value may be adjusted in the disk device 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
   a head;
   a disk in which a plurality of servo tracks is provided concentrically with respect to a first center and a plurality of data tracks is provided concentrically with respect to a second center different from the first center; and
   a controller that adjusts a correction value of a radial position of the servo track according to a ratio between amplitude of a correction value spectrum of a radial position of the servo track at a first circumferential position and amplitude of a correction value spectrum of a radial position of the servo track at a second circumferential position when positioning control of the head to a target data track is performed on a basis of servo information read from the servo track, wherein
   at the first circumferential position, a relative speed of a change in the radial position of the servo track with respect to a radial position of the target data track becomes a first speed, and
   at the second circumferential position, a relative speed of a change in the radial position of the servo track with respect to the radial position of the target data track becomes a second speed.

2. The disk device according to claim 1, wherein the second speed is smaller than the first speed.

3. The disk device according to claim 1, wherein
   at the first circumferential position, the relative speed of the change in the radial position of the servo track with respect to the radial position of the target data track becomes a maximum speed, and
   at the second circumferential position, the relative speed of the change in the radial position of the servo track with respect to the radial position of the target data track becomes zero.

4. The disk device according to claim 1, wherein
   the first circumferential position includes circumferential positions of 0/4 round, 2/4 round, and 4/4 round with respect to the target data track, and
   the second circumferential position includes circumferential positions of circumferential positions of 1/4 round and 3/4 round with respect to the target data track.

5. The disk device according to claim 1, wherein
   the controller estimates a correction value of the second circumferential position from a correction value of the first circumferential position according to the ratio, combines an adjustment value according to an estimation result with the correction value of the second circumferential position, and adjusts the correction value of the second circumferential position.

6. The disk device according to claim 1, wherein
   the controller obtains the ratio between amplitude of a correction value spectrum of a radial position of the servo track at the first circumferential position and amplitude of a correction value spectrum of a radial position of the servo track at the second circumferential position for a plurality of orders of components in a change in the radial position of the servo track with respect to the radial position of the target data track, and determines an order of a component to be adjusted according to the obtained ratio.

7. The disk device according to claim 6, wherein
   the controller generates relationship information indicating a relationship between a correction value spectrum and a radial position of the servo track for the determined order, and estimates a variation amount of the radial position of the servo track at the second circumferential position using the relationship information.

8. The disk device according to claim 6, wherein
   the controller applies first weighting that amplifies with respect to the second circumferential position to the estimated variation amount, applies second weighting that attenuates with respect to the second circumferential position to a correction value of the radial position of the servo track, and combines the correction value to which the second weighting is applied with the variation amount to which the first weighting is applied to obtain the adjusted correction value.

9. The disk device according to claim 1, wherein
   the controller performs positioning control of the head to the target data track using the adjusted correction value.

10. A disk device comprising:
    a head;
    a disk in which a plurality of servo tracks is provided concentrically with respect to a first center and a plurality of data tracks is provided concentrically with respect to a second center different from the first center;
    a controller that adjusts a correction value of a radial position of the servo track according to a ratio between amplitude of a correction value spectrum of a radial position of the servo track at a first circumferential position and amplitude of a correction value spectrum of a radial position of the servo track at a second circumferential position when positioning control of the head to a target data track is performed on a basis of servo information read from the servo track, wherein the first circumferential position corresponds to a first phase in a periodic change of the radial position of the servo track with respect to a radial position of the target data track, and the second circumferential position corresponds to a second phase in the periodic change.

11. The disk device according to claim 10, wherein
the periodic change includes a change in a sinusoidal shape, and
the first phase is a phase of zero degrees or 180 degrees, and
the second phase is a phase of 90 degrees or 270 degrees.

12. The disk device according to claim 10, wherein
the controller estimates a correction value of the second circumferential position from a correction value of the first circumferential position according to the ratio, combines an adjustment value according to an estimation result with the correction value of the second circumferential position, and adjusts the correction value of the second circumferential position.

13. The disk device according to claim 10, wherein
the controller obtains the ratio between amplitude of a correction value spectrum of a radial position of the servo track at the first circumferential position and amplitude of a correction value spectrum of a radial position of the servo track at the second circumferential position for a plurality of orders of components in the periodic change, and determines an order to be adjusted according to the obtained ratio.

14. The disk device according to claim 13, wherein
the controller generates relationship information indicating a relationship between a correction value and a radial position of the servo track for the determined order, and estimates a variation amount of the radial position of the servo track at the second circumferential position using the relationship information.

15. The disk device according to claim 13, wherein
the controller applies first weighting that amplifies with respect to the second circumferential position to the estimated variation amount, applies second weighting that attenuates with respect to the second circumferential position to a correction value of the radial position of the servo track, and combines the correction value to which the second weighting is applied with the variation amount to which the first weighting is applied to obtain the adjusted correction value.

16. The disk device according to claim 10, wherein
the controller performs positioning control of the head to the target data track using the adjusted correction value.

17. A disk device comprising:
a head;
a disk in which a plurality of servo tracks is provided concentrically with respect to a first center and a plurality of data tracks is provided concentrically with respect to a second center different from the first center;
a controller that adjusts a correction value of a radial position of the servo track on a basis of amplitude of a correction value spectrum of a radial position of the servo track at a first circumferential position and amplitude of a correction value spectrum of a radial position of the servo track at a second circumferential position when positioning control of the head to a target data track is performed on a basis of servo information read from the servo track, wherein
a first relative speed of a change in the radial position of the servo track with respect to a radial position of the target data track at the first circumferential position is different from
a second relative speed of a change in the radial position of the servo track with respect to a radial position of the target data track at the second circumferential position.

18. The disk device according to claim 17, wherein
the second relative speed is smaller than the first relative speed, and
the controller estimates a correction value of the second circumferential position from a correction value of the first circumferential position, combines an adjustment value according to an estimation result with the correction value of the second circumferential position, and adjusts the correction value of the second circumferential position.

19. The disk device according to claim 18, wherein
the controller estimates a correction value of the second circumferential position from a correction value of the first circumferential position according to a ratio between amplitude of a correction value spectrum of a radial position of the servo track at the first circumferential position and amplitude of a correction value spectrum of a radial position of the servo track at the second circumferential position.

20. The disk device according to claim 17, wherein
the controller performs positioning control of the head to the target data track using the adjusted correction value.

* * * * *